(12) United States Patent
Richter

(10) Patent No.: US 11,880,434 B1
(45) Date of Patent: Jan. 23, 2024

(54) APPARATUS AND METHODS FOR TEMPORARILY SHARING NON-FUNGIBLE TOKENS (NFTS)

(71) Applicant: Linda Lee Richter, Oakland, CA (US)

(72) Inventor: Linda Lee Richter, Oakland, CA (US)

(73) Assignee: Linda Lee Richter, Oakland, CA (US)

( * ) Notice: Subject to any disclaimer, the term of this patent is extended or adjusted under 35 U.S.C. 154(b) by 0 days.

(21) Appl. No.: 18/112,145

(22) Filed: Feb. 21, 2023

(51) Int. Cl.
*G06F 21/10* (2013.01)
*G06F 21/60* (2013.01)

(52) U.S. Cl.
CPC ............ *G06F 21/10* (2013.01); *G06F 21/602* (2013.01); *G06F 21/1014* (2023.08)

(58) Field of Classification Search
CPC . G06F 21/10; G06F 21/602; G06F 2221/0711
See application file for complete search history.

(56) References Cited

U.S. PATENT DOCUMENTS

| 11,367,060 | B1* | 6/2022 | Barbashin | G06Q 30/0201 |
| 11,562,451 | B1* | 1/2023 | Kozlowski, III | G06Q 20/4014 |
| 2021/0248214 | A1* | 8/2021 | Goldston | G06F 16/686 |
| 2023/0129900 | A1* | 4/2023 | Jakobsson | H04L 63/101 |
| | | | | 726/4 |

* cited by examiner

*Primary Examiner* — Abiy Getachew
(74) *Attorney, Agent, or Firm* — Caldwell Intellectual Property Law

(57) ABSTRACT

An apparatus and method for temporarily sharing a non-fungible token (NFT), the apparatus includes at least a processor, a memory communicatively connected to the at least processor, wherein the memory containing instructions configuring the at least processor to receive a data collection, wherein the data collection comprises a plurality of data objects associated with at least one NFT, verify the at least one NFT as a function of the data collection, identify an in-force time element as a function of the at least one NFT, determine at least one designated utility of the at least one NFT, and generate a self-executing action protocol for interests to the at least one NFT as a function of the in-force time element and the at least one designated utility of the at least one NFT.

16 Claims, 7 Drawing Sheets

APPARATUS AND METHODS FOR TEMPORARILY SHARING NON-FUNGIBLE TOKENS (NFTS)

FIELD OF THE INVENTION

The present invention generally relates to the field of NFTs. In particular, the present invention is directed to an apparatus and methods for temporarily sharing non-fungible tokens (NFTs).

BACKGROUND

NFTs can be associated with a particular digital or physical asset such as images, art, music, physical goods, real estate, and life moments, and the like. They may also confer different types of interests to the asset for a specific purpose. Volumes as well as the types of NFT transactions have increased exponentially over the years. Rights for NFT tracking can be hard to manage and track. Existing solutions are not sufficient.

SUMMARY OF THE DISCLOSURE

In one aspect, an apparatus for temporarily sharing a non-fungible token (NFT), wherein the apparatus includes at least a processor and a memory communicatively connected to the at least a processor, wherein the memory containing instructions configuring the at least a processor to receive a data collection, wherein the data collection includes a plurality of data objects associated with at least one NFT, verify the at least one NFT as a function of the data collection, identify an in-force time element as a function of the at least one NFT, determine at least one designated utility of the at least one NFT, and generate a self-executing action protocol for interests to the at least one NFT as a function of the in-force time element and the at least one designated utility of the at least one NFT.

In another aspect, a method for temporarily sharing a non-fungible token (NFT), wherein the method includes receiving, by at least a processor, a data collection, wherein the data collection includes a plurality of data objects associated with at least one NFT, verifying, by the at least a processor, the at least one NFT as a function of the data collection, identifying, by the at least a processor, an in-force time element as a function of the at least one NFT, determining, by the at least a processor, at least one designated utility of the at least one NFT, and generating, by the at least a processor, a self-executing action protocol for interests to the at least one NFT as a function of the in-force time element and the at least one designated utility of the at least one NFT.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
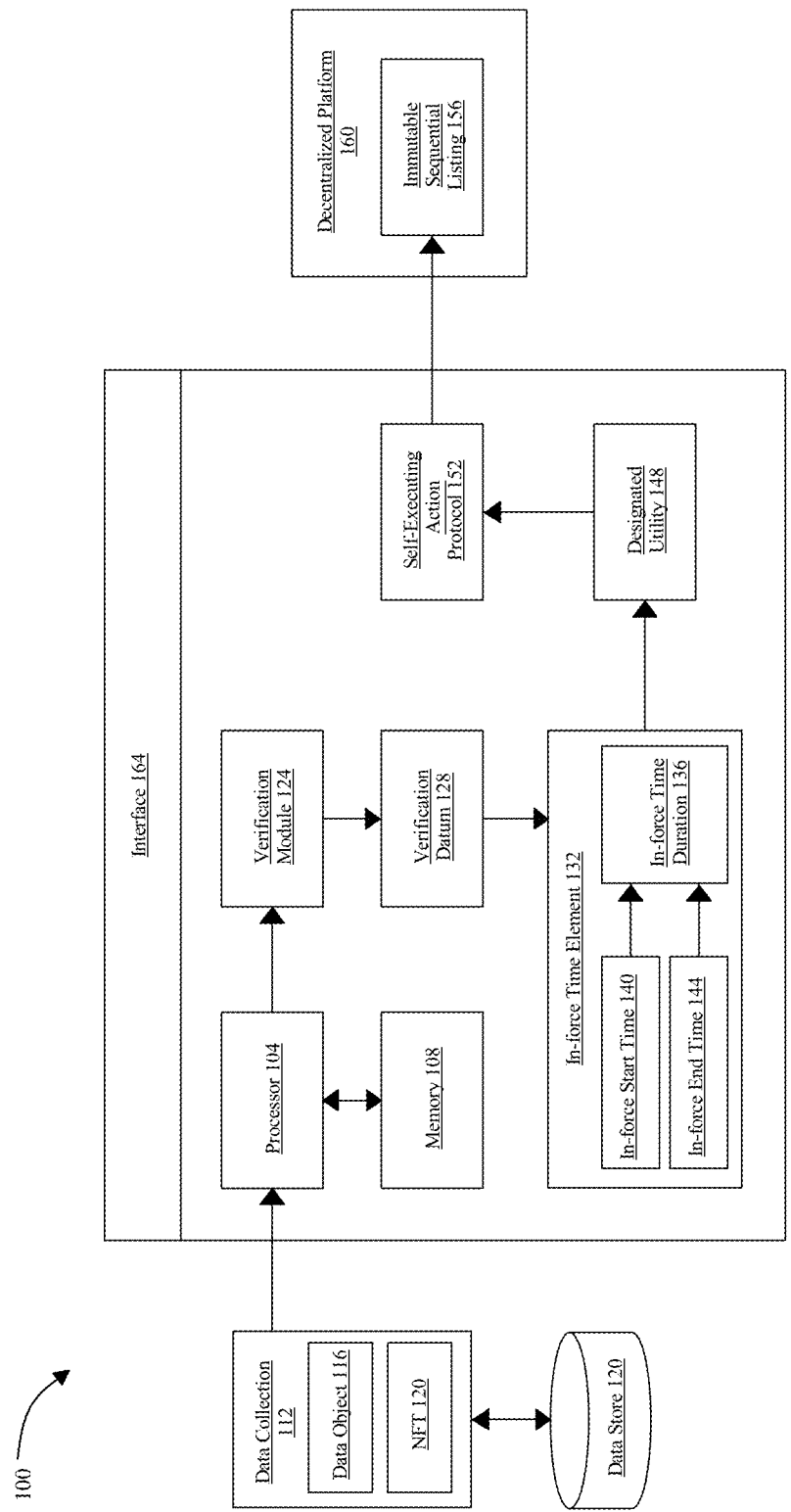
FIG. 1 is a block diagram of an apparatus for temporarily sharing an NFT.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for temporarily sharing an NFT. In one embodiment, the apparatus and methods may be used to determine a designated utility of the NFT in order to generate a self-executing action protocol for interests to the NFT.

Aspects of the present disclosure can be used to facilitate different utilities of the NFT based on user categories and/or different recommendations, which can be specific to, and/or mix together, the utilities of the NFT. In addition, aspects of the present disclosure can also be used to store the self-executing action protocol for interests to the NFT in immutable sequential listings on decentralized platforms.

Exemplary embodiments illustrating aspects of the present disclosure are described below in the context of several specific examples.

In an embodiment, methods and apparatuses described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q. A further example of asymmetrical cryptography may include lattice-based cryptography, which relies on the fact that various properties of sets of integer combination of basis vectors are hard to compute, such as finding the one combination of basis vectors that results in the smallest Euclidean distance. Embodiments of cryptography, whether symmetrical or asymmetrical, may include quantum-secure cryptography, defined for the purposes of this disclosure as cryptography that remains secure against adversaries possessing quantum computers; some forms of lattice-based cryptography, for instance, may be quantum-secure.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof, for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of apparatus 100 for temporarily sharing a NFT is illustrated. Apparatus 100 includes at least a processor 104 and a memory 108 communicatively connected to processor 104, wherein memory 108 contains instructions configuring processor 104 to perform various functions. In one embodiment, and without limitation, processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software and the like.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

Still referring to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, as used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, processor 104 is configured to receive a data collection 112, wherein data collection 112 includes a plurality of data objects associated with at least one NFT 120. As used in this disclosure, "receive" means to accept, collect, or otherwise gather input from a user and/or a device. As used in this disclosure, a "data collection" is an element and/or data structure containing at least a data object related to an NFT. As used in this disclosure, a "data object" describes a single piece of data, such as a variable, an allocated lot of memory such as one or more bytes, nibbles, words, arrays thereof, or the like, which may be stored as a character, number, pixel, or the like, and/or a data structure such as an array, matrix, and/or any data structure storing any form of media, information, or the like. In some cases, data collection 112 may include a plurality of data objects 116. In a non-limiting example, a data collection may be a string containing a plurality of words, wherein each word may be a data object. In some cases, data collection 112 may be in various formats such as, without limitation, txt file, JSON file, word document, pdf file, excel sheet, image, video, audio, and the like thereof. In other cases, data collection 112 may be present in any data structure described in this disclosure. In some embodiments, without limitation, data collection 112 may include any personal information related to the user. In some embodiments, personal information may include, without limitation, user's name, age, gender, identification, profession, experience, social media posts, geographical information, family information, employer, and the like thereof. With continued reference to FIG. 1, in some embodiments, and without limitation, data collection 112 may include the type of digital or physical assets associated with NFT 120 and ownership information regarding NFT 120. Ownership information regarding NFT 120, in one embodiment, may also include whether NFT 120 is a fractional NFT which includes a plurality of portions that are accessible and transferrable separately. In some embodiments, without limitation, data collection 112 may also include any finance information related to the user. In some cases, finance information may include, without limitation, assets, income, expense, debts, and the like thereof. In other embodiments, data collection 112 may further include any health information related to the user. In some cases, health information may include, without limitation, wellness, insurance, medical records, disease records, lifestyle, and the like thereof. In a non-limiting example, processor 104 may receive a data collection in a text file format, wherein the data collection may include user's personal information such as, without limitation, user's name, age, gender, home address, and the like thereof.

With continued reference to FIG. 1, in some embodiments, data collection 112 may include a vector. As used in this disclosure, a "vector" is a data structure that represents one or more quantitative values and/or measures of data collection 112. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes.

With continued reference to FIG. 1, in some embodiments, data collection 112 may include a dictionary. As used in this disclosure, a "dictionary" is a data structure containing an unordered set of key value pairs. In this disclosure, a "key value pair" is a data representation of a data element such as, without limitation, data object 116. In some cases, dictionary may be an associative memory, or associative arrays, or the like thereof. In a non-limiting example, dictionary may be a hash table. In an embodiment, kay value pair may include a unique key, wherein the unique kay may associate with one or more values. In another embodiment, key value pair may include a value, wherein the value may associate with a single key. In some cases, each key value pair of set of key value pairs in dictionary may be separated by a separator, wherein the separator is an element for separating two key value pairs. In a non-limiting example, separator may be a comma in between each key value pairs of plurality of key value pairs within dictionary. In another non-limiting example, a dictionary may be expressed as "{first key value pair, second key value pair}," wherein the first key value pair and the second key value pair may be separate by a comma separator, and wherein both first key value pair and second key value pair may be expressed as "first/second key: first/second value." In a further non-limiting example, data collection 112 may be present as a dictionary: "{1: A, 2: B, 3: C}," wherein A may be a first user related data correspond to a first data object, B may be a second user related data correspond to a second data object, and C may be a third user related data correspond to a third data object. Data object 116 may include any kind of information related to the user such as, without limitation, user's personal information, financial information, health information, and the like thereof. Additionally, or alternatively, dictionary may include a term index, wherein the term index is a data structure to facilitate fast lookup of data object 116 in data collection 112 (i.e., index). In some cases, without limitation, term index may use a zero-based indexing, wherein the zero-based indexing may configure dictionary to start with index 0. In some cases, without limitation, term index may use a one-based indexing, wherein the one-based indexing may configure dictionary to start with index 1. In other cases, without limitation, term index may use a n-based indexing, wherein the n-based indexing may configure dictionary to start with any index from 0 to n. Further, term index may be determined/calculated using one or more hash algorithms. Hash algorithms may be any hash algorithm described above in this disclosure. In a non-limiting example, data collection may be present as a dictionary containing a plurality of hashes, wherein each hash of plurality of hashes represents a single data object. Hash may be any cryptographic hash as described above in this disclosure.

With continued reference to FIG. 1, in other embodiments, data collection 112 may be present as any other data structure such as, without limitation, tuple, single dimension array, multi-dimension array, list, linked list, queue, set, stack, dequeue, stream, map, graph, tree, and the like thereof. In some embodiments, data collection 112 may be present as a combination of more than one above data structures. In a non-limiting example, data collection 112 may be a dictionary of lists. As will be appreciated by persons having ordinary skill in the art, after having read the entirety of this disclosure, the foregoing list is provided by way of example and other data structures can be added as an extension or improvements of apparatus 100 disclosed herein. In some embodiments, without limitation, data collection 112 may be an immutable data collection, wherein the immutable data collection is a data collection that cannot be changed, modified, and/or updated once the data collection is received. In other embodiments, without limitation, data collection 112 may be a mutable data collection, wherein the mutable data collection is a data collection that can be changed, modified, and/or updated once the data collection is received.

With continued reference to FIG. 1, in some cases, data objects 116 associated with NFT 120 may be sorted in a certain order such as, without limitation, ascending order, descending order, and the like thereof. In some embodiments, without limitation, sorting data objects related to NFT 120 within data collection 112 may include using a sorting algorithm. In one embodiment, data object 116 of data collection 112 is related to a transferor and/or a transferee of NFT 120. As used in this disclosure, a "transferor" is a party who makes a transfer or conveyance of property, such as, without limitation, NFT 120, while a "transferee" is a party who is receiving the transfer or conveyance of property, such as, without limitation, NFT 120. In some cases, sorting algorithm may include, but is not limited to, selection sort, bubble sort, insertion sort, merge sort, quick sort, heap sort, radix sort, and the like thereof. As will be appreciated by persons having ordinary skill in the art, after having read the entirety of this disclosure, the foregoing list is provided by way of example and other sorting algorithm can be added as an extension or improvements of apparatus 100 disclosed herein. Association with an NFT may include incorporation in the NFT and/or in a record, such as an immutable sequential listing posting, referring to and/or creating the NFT, of one or more elements of data associated with and/or linked to the data associated with and/or represented by the NFT. For instance, NFT may contain and/or be linked to a representation of data associated with and/or represented by the NFT, where the representation may include a uniform resource locator (URL) or other uniform resource identifier (URI) indicating the data and/or a location where the data may be found and/or viewed, a cryptographic hash of the data, a secure proof of the data and/or proof of knowledge of the data and/or a digital signature created using such proofs and/or the data and/or generated by a person or device associated therewith using, for instance an immutable sequential listing posting or the like, an identifier such as a universally unique identifier (UUID), a globally unique identifier (GUID), an identifier assigned within a system, platform and/or immutable sequential listing, a database record or other memory location of data, and/or any combination of the above.

With continued reference to FIG. 1, additionally, or alternatively, data collection 112 may include an implicit data collection. As used in this disclosure, an "implicit data collection" is data collection that received by processor 104 in an implicit or non-invasive manner that may be collected automatically. An implicit manner may include, without limitation, a manner in which minimal attentions are drawn from a transferor and/or a transferee. In some cases, implicit data collection may include, without limitation, information regarding a user profile, a user category, user's facial activity, posture activity, event activity, vocal expression, language and choice of words, electrodermal activity, any other information that implies user's reliability, and the like thereof. In a non-limiting example, implicit data collection may include a fingerprint received through a digital fingerprinting, wherein the fingerprint is a unique identifier of one or more data objects 116, and wherein the digital fingerprinting is a computational process used to identify and track user, apparatus 100, processor 104, and any other devices described in this disclosure online through a fingerprinting algorithm. In some cases, fingerprint may include, without limitation, acoustic fingerprint, digital video fingerprint, browser fingerprint, and any other digital fingerprint, and the like thereof. In some cases, fingerprinting algorithm may include, without limitation, Rabin's algorithm, hash algorithm described above, and the like thereof. In another non-limiting example, implicit data collection may include one or more data objects 116 received through a network latency analysis, wherein the network latency analysis may provide information regarding to user's current network such as, without limitation, internet protocol, internet protocol address, current domain name system, download speed, upload speed, round trip time (RTT), time to first byte (TTFB), and the like thereof.

With continued reference to FIG. 1, data collection 112 may include one or more data objects 116 that describes one or more signals. as used in this disclosure, a "signal" is any intelligible representation of data, for example from one device to another. A signal may include an optical signal, a hydraulic signal, a pneumatic signal, a mechanical, signal, an electric signal, a digital signal, an analog signal and the like. In some cases, a signal may be used to communicate with a computing device, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

With continued reference to FIG. 1, in some embodiments, apparatus 100 may perform one or more signal processing steps on a signal. For instance, apparatus 100 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables.

Still referring to FIG. 1, in one embodiment, data collection 112 may comprise at least NFT 120 and data objects 116 associated with NFT 120. As used in this disclosure, an "NFT" (non-fungible token), as used in this disclosure, is a unique and non-interchangeable unit of data stored on a digital ledger and/or immutable sequential listing. NFT 120 may be associated with user-specific products which may include physical assets backed by a physical asset such as real estate, precious metals, consumer goods, collectables, and other commodities. NFT 120 may also be associated with user-specific moments and/or experience such as digital assets backed by user-specific data such as the digitization of photos, videos, drawings, and audio, virtual real estate in a metaverse, and a specific highlight of an event in a user' life.

Continuing to refer to FIG. 1, in one embodiment, NFT 120 may be fractionalized and each fraction of NFT 120 can be licensed or rented separately. A "fractional NFT," also referred to as a fractionalized NFT, as used in this disclosure, is an NFT that has been broken down into fractions, and/or has ownership rights associated therewith broken into such fractions, which represent shared ownership in the NFT. The fractions may be accessible individually by one or more transferors and can be licensed or rented by one or more transferees separately. Fractional NFTs can be used to allow groups of renters or lessees (or potential buyers), collectors, and/or community members to come together to execute a transaction and become temporary partial owners of the fractional NFT while the original owner of the fractional NFT may still retain some of the portions. Therefore, multiple parties may portion ownership and the ownership and interests history can be recorded directly on an immutable sequential listing or a blockchain. To break NFT 120 into fractions, in one embodiment, NFT 120 may be locked in a self-executing action protocol (e.g., a smart contract) first before the self-executing action protocol splits NFT 120 into multiple tokens as per the instructions of the owner of NFT 120. The self-executing action protocol may dictate the number of tokens (fractions) to be created, the value of the tokens, the metadata to be used, and any other property the owner may deem important. In a non-limiting exemplary embodiment, for NFTs that use Ethereum's ERC-721 standard, each NFT can be fractionalized into multiple ERC-20 fungible tokens as a result of the split using a self-executing action protocol.

Still referring to FIG. 1, in some embodiments, the type and amount of data collection 112 that is represented in NFT 120 may be determined by data collection 112 which may include metadata such as user profile, user classification, user categories, and value dictation. For instance, a creator or user may "tokenize" such assets to be stored on a digital ledger and/or immutable sequential listing, which may ensure non-duplicability and ownership, generate income by transferring ownership, rent, or license, and/or enable accessibility of the assets. Certain aspects of minting or generating an NFT based on user-specific products (e.g., physical and digital assets) and/or user-specific data (e.g., moments and experiences) are disclosed in U.S. Nonprovisional application Ser. No. 17/984,571, filed on Nov. 10, 2022, entitled "AN APPARATUS AND METHOD FOR MINTING NFTS FROM USER SPECIFIC MOMENTS," U.S. Nonprovisional application Ser. No. 17/984,754 filed on Nov. 10, 2022, entitled "APPARATUS AND METHODS FOR CREATING NON-FUNGIBLE TOKENS (NFTS) FROM USER EXPERIENCE," AND U.S. Nonprovisional application Ser. No. 17/984,804, filed on Nov. 10, 2022, entitled "APPARATUS AND METHODS FOR MINTING NON-FUNGIBLE TOKENS (NFTS) FROM USER-SPECIFIC PRODUCTS AND DATA." Persons skilled in the art, upon reviewing the entirety of this disclosure, will be aware of the various embodiments and purposes of tokenizing an asset.

Still referring to FIG. 1, in some embodiments, receiving data collection may include accepting a smart assessment. As used in this disclosure, a "smart assessment" may include a set of questions and/or prompts that inquires information related to NFT 120 and information associated with an owner of NFT 120, wherein each question and/or prompt may lead to answers that affect the owner's authentication, designation, verification, and any processing step described in this disclosure. In some embodiments, questions within smart assessment may include selecting a section from plurality of selections as answer to reduce bias. In other cases, questions within smart assessment may include a free input as answer. In a non-limiting example, smart assessment may include a question asking the owner of NFT 120 regarding Intellectual Property (IP) ownership. For instance, the question may be "Dose the owner/entity have all interests in the NFT?" In some embodiments, smart assessment may include questions such as "Is the owner/entity the creator of the NFT?" If not, the smart assessment may provide options for the owner to select from a group including collector, collaborator, and/or community member, and the like. In some embodiments, smart assessment may include questions such as "Is the NFT backed by a digital asset?" In some other embodiments, smart assessment may include questions such as "Does the user/entity plan to sell the NFT?" If not, smart assessment may provide further options with respect to the owner's intent of the NFT. In some embodiments, smart assessment may also include questions to facilitate a reasonable determination of the ownership of the NFT such as "Is the NFT fractional?" In some cases, smart assessment may be in a form such as, without limitation, survey, transactional tracking, interview, report, events monitoring, and the like thereof. In some embodiments, smart assessment may include a data submission of one or more documentations from the user. In some embodiments, smart assessment may be consistent with smart assessment disclosed in U.S. patent application Ser. No. 17/984,912, filed on Nov. 10, 2022, and entitled, "APPARATUS AND METHOD FOR VETTING USER USING A COMPUTING DEVICE," which is incorporated by reference herein in its entirety.

Still referring to FIG. 1, in some embodiments, apparatus 100 may utilize a decision tree for the classification of data collection 112, wherein the decision tree is constructed as a function of data collection 112. In one embodiment, and without limitation, processor 104 may be configured to plug in one or more data objects 116 to a plurality of nodes of the decision tree. As used in this disclosure, a "decision tree" is a data structure that represents and combines one or more determinations or other computations with respect to data provided thereto, as well as earlier such determinations or calculations, as nodes of a tree data structure where inputs of some nodes are connected to outputs of others. Plurality of nodes within the decision tree may have at least a "root node" which receives input from data collection 112 and a plurality of "leaf nodes" corresponding to an executed result of the decision tree. In other words, data collection 112 as a root node may be produced by the decision tree to output classifications and/or determinations of in the leaf nodes. In some embodiments, random forest may be used to avoid overfitting of the decision tree.

With continued reference to FIG. 1, verifying NFT 120 as a function of data collection 112 may comprise utilizing a verification module 124 configured to generate a verification datum 128 as a function of data collection 112. A "verification module," as used in this disclosure, is software or hardware configured to authenticate and verify information associated with an NFT. In some embodiments, information may be related ownership type, ownership percentage, and the type of physical and/or digital assets used to back the NFT. A "verification datum," as disclosed herein, is data verified by the verification module; verification may include, without limitation, verification of any association of NFT with data as described in this disclosure, as well as verification of any cryptographic object or process associated with the NFT and/or any record storing the same. In one embodiment, verification module 124 may employ a blockchain verification process to verify NFT 120. A "blockchain," as used in this disclosure, is an incorruptible digital ledger, such as without limitation an immutable sequential listing as described in this disclosure, that can be used to securely record transactions. Anything that is written to the blockchain can't be altered in the future by any party. Blockchains act as decentralized ledgers with multiple nodes in a network and they are continuous chains starting from a genesis block up to the current block. Blockchain verification may include any verification associated with and/or of any immutable sequential listing as described in this disclosure, including without limitation a consensus mechanism-based process. For verification of a transaction related to NFT 120, all nodes of the network participating in operation, creation, verification, storage and/or use of immutable sequential listing and/or blockchain may be configured to confirm the same output by running the hash against data so stored. Otherwise, the transaction is not verified. Once NFT 120 is verified, verification module 124 may generate a verification datum 128 to validate the ownership status of NFT 120. In one embodiment, verification datum 128 may provide a QR code that can be scanned using a QR reader on an electronic device to grant access to verified results associated with NFT 120.

With continued reference to FIG. 1, processor 104 is configured to identify and/or generate an in-force time element 132 as a function of at least one NFT 120. As used in this disclosure, an "in-force time element" is a mechanism that adds a time sensitivity to a component and/or data element such as, without limitation, data collection 112, verification module 124, self-executing action protocol 152, and the like thereof. In a non-limiting example, verification module 124 may include an integration of an in-force time element 132, wherein the in-force time element 132 may be configured to specify a verification timeout. For any NFT verification exceeding such verification timeout, verification module 124 may fail to verify NFT 120 and return NFT 120 to the user. In another non-limiting example, in-force time element may include a time indication such as, without limitation, a time stamp. Time indication such as time stamp may be stored as an entry and/or posting in immutable sequential listing 156, in a hash chain, or using attested time. In a non-limiting example, in-force time element 132 may include a time-varying element, which may have a time limit after which time-varying element is no longer valid. Time limit may be calculated from an initial time, which may be a datum linked to a particular timestamp or other value representing a fixed moment in time, associated with time-varying element; initial time may be a time of creation, a time of verification, or other significant time relating to validity of time-varying token. Initial time may include, without limitation, a timestamp, which may include a secure timestamp, and/or a datum linked to a secure timestamp, such as a cryptographic hash of the secure timestamp or the like. As used herein, a "secure timestamp" is an element of data that immutably and verifiably records a particular time, for instance by incorporating a secure proof, cryptographic hash, or other process whereby a party that attempts to modify the time and/or date of the secure timestamp will be unable to do so without the alteration being detected as fraudulent.

With continued reference to FIG. 1, in some embodiments, in-force time element 132 may include an in-force time duration 136. In-force time duration 136 may be defined by an in-force start time 140 and an in-force end time 144. As used in this disclosure, an "in-force time duration" is a length of time that between a first time and a second time. Component and/or data covered by in-force time duration 136 are operative, effective, or otherwise valid within the duration. In a non-limiting example, user may be above to accesses and or modify data collection 112 covered by in-force time duration 136; for instance, reselecting NFT 120. As used in this disclosure, a "in-force start time" is a time indicating a start of a process, and a "in-force end time" is a time indicating a termination of a process. Process may include any of processing steps described in this disclosure or a combination thereof. In some embodiments, identifying in-force time element 132 may include identifying in-force time duration 136, wherein identifying in-force time duration 136 may include identifying in-force start time and in-force end time. In some embodiments, in-force time element 132 may be identified based on type of NFT. In a non-limiting example, NFT 120 may include a utility NFT. A "utility NFT," as disclosed herein, is a type of NFT with use cases beyond being associated with unique digital and/or physical assets, which may afford its holders privileges, interests, and/or rewards that they would not otherwise be able to access. Processor 104 may determine in-force time duration 136 for transferee to temporarily possess such NFT based on its content. For example, a particular NFT game prop may only be rented for a fixed period of 7 days. For another example, a NFT event ticket may include tickets for a plurality of sessions, transferor may rent a session within a plurality of sessions to a transferee for an in-force time duration 136, wherein the in-force time duration 136 may be identified as the duration of the event session. In some embodiments, in-force time duration 136 as well as in-force start time 140 and in-force end time 144 may be identified automatically by processor 104. In a non-limiting example, in-force start time 140 may include current date and time when data collection 112 is received by processor 104 and in-force end time 144 may include a future data and time after in-force start time 140 when self-executing action protocol 152 is generated. Additionally, or alternatively, in-force time duration 136 as well as in-force start time 140 and in-force end time 144 may be identified manually by the user. In a non-limiting example, data collection 112 may include an in-force start time 140 designated by transferee as a lease begin time of a NFT from transferor within data collection 112, and an in-force end time 144. designated by transferee as a lease end time of the NFT, wherein the in-force start time and the in-force end time may define an in-force time duration that covers the transferee, transferor, and leased NFT within in-force time element of self-executing action protocol 152; for instance, transferee may use leased NFT in limited ways during in-force time duration, while transferor may not be able to sell, borrow, rent, license and the like to other users. With continued reference to FIG. 1, With continued reference to FIG. 1, in some embodiments, in-force time element may be implemented as a timer. In a non-limiting example, in-force time element 132 may be configured to keep track of time from in-force start time 140 to in-force end time 144. Such function may be terminated when in-force end time 144 is reached. In some embodiments, in-force time element may use one or more block properties of a block within blockchain to calculate time. As used in this disclosure, a "block property" is an attribute of the block or transaction. In some cases, block properties may include, without limitation, block hash, block number, block timestamp, and the like. Calculating time may include calculating, without limitation, time past in-force start time, time left until in-force end time, time latency and the like. In a non-limiting example, in-force time element may calculate time using a block number property of a block, wherein the block is configured to store data collection 112 in decentralized platform 160. As used in this disclosure, a "block number" is a value of time for decentralized platform 160 to generate a block; for instance, every new block may be generated within approximately 14 to 15 second on decentralized platform 160. In-force time element 132 may measure time by measuring time in 14 to 15 second intervals in consistent with block number. Decentralized platform 160 disclosed here may be described in further detail below. Additionally, or alternatively, in-force time element 132 may be synchronized between apparatus 100 and other devices, components, or modules. In a non-limiting example, processor 104 may be configured to sync time of in-force time element 132 with a trusted time server using a time protocol, wherein the trusted time server is a trusted device within decentralized platform 160 contain a trusted time, and wherein the time protocol is a networking protocol for clock synchronization between devices over a packet-switched, variable-latency data network.

With continued reference to FIG. 1, identifying an in-force time element 132 may include performing a trusted time evaluation of at least one NFT by processor 104. As a non-limiting example, secure proof may be generated using a secure timestamp. Generating the secure timestamp may include digitally signing the secure timestamp using any digital signature protocol as described above. In one embodiment authenticity of received data signals is established by utilizing a chain of attestation via one or more attestation schemes (in nonlimiting example, via direct anonymous attestation (DAA)) to verify that at least one NFT is an authentic NFT that has the property of attested time. Generating a secure timestamp may be used to weed out spoofers or "man in the middle attacks."

With continued reference to FIG. 1, secure timestamp may record the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using in-force time element 132. Additional data may include one or more additional data, including verification datum 128, that are generated by processor 104. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data, e.g., verification datum 128, along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively, or additionally, one or more additional participants, such as other verifying nodes, may evaluate secure timestamp, or other party generating secure timestamp and/or perform threshold cryptography with a plurality of such parties, each of which may have performed an embodiment of method to produce a secure timestamp. In an embodiment, data store 120 or other parties authenticating digitally signed assertions, devices, and/or user credentials may perform authentication at least in part by evaluating timeliness of entry and/or generation data as assessed against secure timestamp. In an embodiment, secure proof is generated using an attested computing protocol; this may be performed, as a non-limiting example, using any protocol for attested computing as described above.

Still referring to FIG. 1, in some embodiments, processor 104 may be configured to determine at least one designated utility 148 of NFT 120 using a utility designation machine-learning model configured to correlate verification datum 128 to a designated utility datum. In some cases, designated utility 148 of NFT 120 may include, without limitation, rent, license, borrow, and the like thereof. A "designated utility datum," as disclosed herein, is a datum concerning a designated utility 148 of NFT 120. In some embodiment, it may include an exclusive utility and/or a mix of different utilities of the NFT. For instance, in a non-limiting example, a designated utility datum of an NFT is to transfer the partial ownership temporarily of the NFT from a transferor to a transferee, wherein the NFT is backed by a digital art piece. As used in this disclosure, a "utility designation machine learning model" is a machine-learning model that is capable of determining at least one designated utility 148. A "machine-learning model," as used in this disclosure, involves a process that automatedly uses training data to generate an algorithm and/or model performed by processor 104 to produce outputs given data provided as inputs, for instance and without limitation as described in further detail below. This is in contrast to a non-machine learning software program where the commands to be executed are determined in advance by a user and written in a programming language. Training data, which may include any training data as described in further detail below, is data including correlations and/or examples usable by a machine learning algorithm to generate machine-learning models and/or to be operated on by a lazy learning algorithm as described below. In a non-limiting example, utility designation machine learning model may be trained using utility designation training data, wherein the utility designation training data may include a plurality of verification data 128 as input and a plurality of designated utility data as output. In some embodiments, utility designation training data may be retrieved from data store 154 described below. Utility designation machine learning model may be configured to output a utility designation datum for a given verification datum 128. Outputting the utility designation datum may include converting the utility designation datum to at least one designated utility 148 described above using processor 104.

Still referring to FIG. 1, training data may be obtained by processor 104 in any manner and/or form as described anywhere in this disclosure, including and without limitation retrieving from data store 154 such as, without limitation, a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, data store 154 may be a blockchain storage. In some embodiments, blockchain storage may be a decentralized data store. In a non-limiting example, blockchain storage may be configured to save data such as, without limitation, data collection 112 in a decentralized network, wherein the decentralized network may distribute data collection 112 and/or data collection processing across multiple devices. Data collection processing may include any processing step described in this disclosure. In some embodiments, blockchain storage may be configured to process data collection 112 through a sharding process, wherein the sharding process is a data store partitioning that separates into a plurality of smaller data stores known as data store shards. As used in this disclosure, a "data store shard" is a horizontal/vertical partition of data such as, without limitation, data collection 112 in a data store that hold on a separate instance of the data store. Each shard may be copied to prevent data loss. Additionally, or alternatively, data collection 112 may be encrypted with private key. Private key may be any encryption key described above in this disclosure. Encryption of data collection 112 may include any processing steps described anywhere in this disclosure.

With continued reference to FIG. 1, in some embodiments, data store 154 may be a web storage, wherein the web storage is a data store for storing client-side (i.e., user side) data such as, without limitation, data collection 112. In a non-limiting example, web storage may be configured to store user's identification number (ID) and username within data collection 112. In some embodiments, without limitation, web storage may include a local storage, wherein the local storage is a web storage that store data collection 112 with no expiration date. In other embodiments, without limitation, web storage may include a session storage, wherein the session storage is a web storage that stores data collection 112 for a session, wherein the session is a time-delimited two-way link between two or more devices or ends. In a non-limiting example, user may start a session by open interface 164. Data collection 112 may be stored in a session storage during any processing step described in this disclosure. Data collection 112 may be deleted and unavailable to both user and apparatus 100 when interface 164 is closed.

Continuing to refer to FIG. 1, in one embodiment, and without limitation, processor 104 is configured to train a utility designation machine-learning model using at least a training data and a machine-learning process. In some embodiments, the training data correlates verification datum 128 to a designated utility datum. In some embodiments, the machine-learning process may include a classifier, which may classify inputs such as data objects 116 of data collection 112 into different ownership interests and/or other types of user-specific data. A "classifier," as used in this disclosure is a machine-learning model, such as a mathematical model, neural net, or program generated by a machine learning algorithm known as "classification algorithm," as described in further detail below, that parses inputs into categories or bins of data, outputting the categories or bins of data and/or labels associated therewith. In one embodiment, a classifier is trained to determine whether the owner of an NFT should rent the NFT based on training data that correlates prior NFT rental transaction records with ownership percentage. A classifier may be configured to output at least a datum that labels or otherwise identifies a set of data that are clustered together, found to be close under a distance metric as described below, or the like. Processor 104 and/or another device may generate a classifier using a classification algorithm, defined as a process whereby a processor derives a classifier from training data. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a further non-limiting example, classification may be performed using a neural network classifier such as without limitation a convolutional neural network-based classifier. A convolutional neural network is a neural network in which at least one hidden layer is a convolutional layer that convolves inputs to that layer with a subset of inputs known as a "kernel," along with one or more additional layers such as pooling layers, fully connected layers, and the like.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)\ P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, Processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, a decision tree may be incorporated with one or more machine-learning process to generate new data structures for verification datum 128 which may be configured as input for the utility designation machine-learning model. In another non-limiting example, utility designation machine-learning model may include a language processing module and/or an image processing module configured to extract one or more data objects, textual information, image information, and the like associated with NFT 120. Language processing modules and image processing modules may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Image processing module may be configured using fuzzy sets to extract, from the one or more documents, a plurality of features and/or elements associated with NFT 120. Textual data and image data may be parsed into tokens, which may include a simple word (sequence of letters separated by whitespace), or more generally a sequence of characters as described previously, or pixels, a plurality of pixels, a fraction of a digitization of a user-specific product. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Continuing to refer to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or processor 104 may perform this analysis using a selected set of documents concerning NFT 120, and/or data objects 116 such as owner profile, owner intent, owner category, and or ownership, which also including documents identified by one or more experts as representing good information; experts may identify or enter such documents via graphical user interface such as interface 164, or may communicate identities of significant documents according to any other suitable method of electronic communication, or by providing such identity to other persons who may enter such identifications into processor 104. In one embodiment, interface 164 is communicatively connected to processor 104 and interface 164 is configured to display NFT 120. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, processor 104 is configured to generate a self-executing action protocol 152 for interests to NFT 120 as a function of the in-force time element and the at least one designated utility 148 of NFT 120. As used in this disclosure, a "self-executing action protocol" is an algorithm, data structure, and/or record which automatically executes and controls legally relevant events and actions according to the terms of a contract. A "right," as disclosed herein, is the legal entitlement possessed by an NFT owner to act with respect to the NFT. In a non-limiting example, the NFT owner may be entitled to, rent, license, and/or display the NFT that he or she possesses a right to. In some cases, self-executing action protocol 152 may be generated before or at the beginning of in-force time duration 136 specified within in-force time element 132; for instance, processor 104 may be configured to generate self-executing action protocol 152 that is valid through in-force end time 144 exactly at in-force start time 140. In another non-limiting example, the NFT owner may be entitled to sell and/or display the NFT that he or she possess a right to. Certain aspects of selling and/or buying NFT are disclosed in U.S. Nonprovisional application Ser. No. 17/984,862, filed on Nov. 10, 2022, entitled "AN APPARATUS AND METHODS FOR EXECUTING A TRANSACTION PROTOCOL FOR RIGHTS TO NON-FUNGIBLE TOKENS(NFTS)." In one embodiment, processor 104 is configured to receive and verify data collection 112, wherein data collection 112 includes data objects 116 associated with NFT 120 including ownership status, ownership percentage, ownership type, owner profile, owner category, owner intent, and the like thereof. Processor is then configured to identify an in-force time element 132 containing an in-force time duration 136 defined by an in-force start time 140 and an in-force end time 144. Processor 104 is then configured to determine at least one designated utility 148 of NFT 120 using a utility designation machine-learning model before generating self-executing action protocol for interests to NFT 120 as a function of the in-force time element and the at least one designated utility 148. Certain aspects of generating a self-executing action protocol are disclosed in U.S. Nonprovisional application Ser. No. 17/984,678, filed on Nov. 10, 2022, entitled "APPARATUS AND METHOD FOR GENERATING USER-SPECIFIC SELF-EXECUTING RECORDS." The self-executing record may be a self-executing record with the terms of the record between users being directly written into lines of code. Self-executing action protocol 152 may be configured to allow records and agreements to be carried out among disparate, anonymous user without the need for a central figure, legal system, or external enforcement. For example, processor 104 may be configured to generate a self-executing record based on ownership type, owner intent, ownership percentage, the type of physical and/or digital assets utilized to back NFT 120, and the utility of NFT 120. Objectives of self-executing records may include reduction of need in trusted intermediators, arbitrations and enforcement costs, fraud losses, as well as the reduction of malicious and accidental exceptions.

With continued reference to FIG. 1, in some embodiments, self-executing action protocol 152 may include a plurality of transaction stages. As used in this disclosure, a "transaction stage" is a point, period, or otherwise step in the transaction process established by self-executing action protocol 152. In some embodiments, without limitation, plurality of transaction stages may include a formation stage, wherein the formation stage is a phase of creating self-executing action protocol 152. In some embodiments, formation stage may include reiterating and/or negotiating terms in the contract; for instance, without limitation, terms may include interests to NFT, specification of in-force start time 140 and/or in-force end time 144, and the like thereof. Transferor (i.e., owner) and transferee (i.e., renter) may agree or disagree on the content of self-executing action protocol 152. In a non-limiting example, self-executing action protocol 152 may be a codified written contract and published to decentralized platform 160 as part of a transaction block by processor 104. Self-executing action protocol 152 may not be amended by either transferor or transferee, or any other user on decentralized platform 160 once decentralized platform accepts the transaction block. In some embodiments, without limitation, plurality of transaction stages may include a freeze stage, wherein the freeze stage is a phase of validation of the transaction. In some embodiments, validation may be done by a plurality of nodes across the network, wherein each node is a computing device. Computing device may include any computing device described in this disclosure. In some embodiments, during freeze stage, any transfers to transferor's or transferee's digital assets may be blocked. In a non-limiting example, plurality of nodes may iteratively verify predetermined conditions of self-executing action protocol 152 such as payment amount required by self-executing action protocol 152 to which both transferor and transferee agree. In some embodiments, without limitation, plurality of transaction stages may include an execution stage, wherein the execution stage is a phase of execute self-executing action protocol 152. In a non-limiting example, plurality of nodes may read self-executing action protocol 152 and execute code within self-executing action protocol 152 through a compiler. In some embodiments, without limitation, plurality of transaction stages may include a finalization stage, wherein the finalization stage is a phase when self-executing action protocol 152 has been executed, and all involved parties' state are updated; for instance, transferee may temporarily obtain partial interests to transferor's NFT, while transferor may temporarily lose partial interests to his or her NFT in exchange for payment submitted by transferee. In some embodiments, transfers to transferor's or transferee's digital assets may be unblocked during finalization stage. Persons skilled in the art, upon reviewing the entirety of this disclosure, will be aware of the various embodiments and implementation of plurality of transaction stages of self-executing action protocol for purposes as described herein.

With continued reference to FIG. 1, in one embodiment, and without limitation, processor 104 may generate self-executing action protocol 152 for minting NFT 120. A self-executing action protocol, in one embodiment, may permit trusted transactions and agreements to be carried out among disparate, anonymous parties without the need for a central authority, legal system, or external enforcement mechanism. They may conform to various standards, such as ERC-721. A standard may provide functionalities for self-executing action protocols. As a further non-limiting example, a self-executing action protocol can contain and/or include in postings representations of one or more agreed upon actions and/or transactions to be performed. A self-executing action protocol may contain and/or include payments to be performed, including "locked" payments that are automatically released to an address of a party upon performance of terms of contract. A self-executing action protocol may contain and/or include in postings representations of items to be transferred, including without limitation, NFT 164 or crypto currencies. Persons skilled in the art, upon reviewing the entirety of this disclosure, will be aware of the various embodiments and implementation of a self-executing action protocol for purposes as described herein.

Continuing to refer to FIG. 1, in other embodiments, self-executing action protocol 152 may be generated to assign temporary ownership of the token between a transferor and a transferee. For instance, and without limitation, self-executing action protocol 152 may be generated to assign a temporary token ownership until one or more predetermined conditions are met, wherein the temporary token ownership may be conditioned based on in-force time duration 136 specified within in-force time element 132. Temporary token ownership may also be conditioned upon categories of the transferor and transferee and/or different utility of an NFT. In a non-limiting example, the transferor may be a creator/owner and the transferee may be a gallery owner and/or community member, and the NFT is backed by a digital asset in the form of a digital art. As such, self-executing action protocol 152 may be generated to assign temporary ownership in the digital art from the owner/creator to the gallery owner for an in-force time duration 136 and the ownership automatically transfers back to the owner/creator when in-force end time 144 of the in-force time duration 136 is reached. Self-executing action protocol 152 may also allow modification of display and/or access interests to the NFT as agreed upon between the transferor and the transferee. In another non-limiting example, the transferor may be the owner of a fractionalized NFT backed by real estate properties and there are multiple transferees (i.e., renters) who may temporarily obtain a fraction of the NFT (i.e., partial areas of real estate properties) until a predetermined condition met. As such, self-executing action protocol 152 may be generated to replace a fractional NFT with a plurality of predetermined fungible tokens based on a predetermined value of the fractionalized NFT and temporarily assign fractionalized portions to the transferees as agreed upon based on predetermined conditions. Plurality of predetermined fungible tokens may be converted back to NFT once in-force time duration 136 ends. In one embodiment, self-executing action protocol 152 can be deployed to create fractional ownership by generating ERC20 tokens linked to an indivisible ERC721 NFT and each transferee of an ERC20 token owns a percentage of the ERC721 token. Additionally, or alternatively, self-executing action protocol 152 may be generated to assign permanent ownership of the token between a transferor and a transferee; for instance, generating self-executing action protocol 152 for assigning permanent ownership of NFT may be disclosed in U.S. Nonprovisional application Ser. No. 17/984,862, filed on Nov. 10, 2022, entitled "AN APPARATUS AND METHODS FOR EXECUTING A TRANSACTION PROTOCOL FOR RIGHTS TO NON-FUNGIBLE TOKENS(NFTS)."

With continued reference to FIG. 1, in some embodiments, generating self-executing action protocol 152 may further include activating self-executing action protocol 152 for interests to at least one NFT 120 as a function of in-force start time 140 and deactivating self-executing action protocol 152 for interests to at least one NFT 120 as a function of the in-force end time 144. As used in this disclosure, "activating" means executing arrangement within self-executing action protocol 152. In a non-limiting example, self-executing action protocol 152 may include arrangement of obtaining digital assets from transferor and/or transferee. Processor 104 may be configured to activate self-executing action protocol 152 at in-force start time 140 specified in in-force time element 132 within self-executing action protocol 152. In-force time element may be identified by transferee during formation stage of self-executing action protocol 152. Activating self-executing action protocol 152 may include collecting required digital assets from both transferor and transferee. In some embodiments, activating self-executing action protocol 152 may include generating a wrapped NFT (WNFT) as a function of at least one NFT 120. As used in this disclosure, a "wrapped NFT" is a unique copy of the original NFT with same features as the original asset and is backed up by the original NFT. In some embodiments, generating wrapped NFT may include wrapping at least one NFT 120 in a different standard. In a non-limiting example, wrapping at least one NFT 120 may include exchanging a first set of standards with a second set of standards; for instance, NFT 120 with a first ERC20 standard on decentralized platform 160 may be wrapped with a second ERC20 standard of a second decentralized platform besides decentralized platform 160. In some embodiments, wrapped NFT may only be usable within second decentralized platform. As used in this disclosure, "deactivating" means terminating the execution of self-executing action protocol 152. In a non-limiting example, processor 104 may be configured to deactivate self-executing action protocol 152 at in-force end time 144 specified in in-force time element 132 within self-executing action protocol 152 during finalization stage. Deactivating self-executing action protocol 152 may include return NFT 120 back to transferor and/or one or more collaterals back to transferee. In some embodiments, deactivating self-executing action protocol 152 may include destroying wrapped NFT. As used in this disclosure, "destroying" means burning wrapped NFT. In some embodiments, destroying wrapped NFT may include removing wrapped NFT from self-executing action protocol 152 and from the entire transaction. Removing wrapped NFT may further include removing wrapped NFT from circulation of NFTS. In a non-limiting example, self-executing action protocol 152 may be activated when transferee submit his or her digital assets for renting NFT 120 holds by transferor and a wrapped NFT base on NFT 120 may be created. Payment time may be automatically recorded by processor 104 as in-force start time 140. Transferee may specify number of days from in-force start time 140 as in-force end time 144. Self-executing action protocol 152 may be in execution stage for the entire in-force time duration 136 defined by in-force start time 140 and in-force end time 144. Transferee may receive wrapped NFT contains same features backed up by NFT 120 and partial interests associated with NFT 120, while transferor may still own NFT 120, and partial or entire interests associated with it throughout in-force time duration 136. Wrapped NFT may be burned during deactivating self-executing action protocol 152 after specified number of days (i.e., in-force end time 144 reached). Burning wrapped NFT may include sending wrapped NFT into an irretrievable public address, wherein the irretrievable public address may be configured to display status of all nodes that are permanently frozen (i.e., burned NFT, expired contract, and the like), thus making wrapped NFT unavailable on any decentralized platform. Such collateral-less renting for NFT may minimize financial risks for both parties.

With continued reference to FIG. 1, apparatus 100 may include a decentralized platform 160 for which the processor 104 and/or apparatus 100 may operate on. A "decentralized platform," as used in this disclosure, is a platform or server that enables secure data exchange between anonymous parties. Decentralized platforms may be supported by any blockchain technologies. For example, and without limitation, blockchain-supported technologies can potentially facilitate decentralized coordination and alignment of human incentives on a scale that only top-down, command-and-control structures previously could. "Decentralization," as used in this disclosure, is the process of dispersing functions and power away from a central location or authority. In a non-limiting embodiment, decentralized platform can make it difficult if not impossible to discern a particular center. In some embodiments, decentralized platform can include a decentralized ecosystem. Decentralized platform may serve as an ecosystem for decentralized architectures such as an immutable sequential listing 156 and/or blockchain.

In a non-limiting embodiment, and still referring to FIG. 1, decentralized platform may implement decentralized finance (DeFi). "Decentralized finance," as used in this disclosure, as financial technology based on secure distributed ledgers similar. A decentralized finance architecture may include cryptocurrencies, software, and hardware that enables the development of applications. Defi offers financial instruments without relying on intermediaries such as brokerages, exchanges, or banks. Instead, it uses smart contracts on a blockchain. DeFi platforms allow people to lend or borrow funds from others, speculate on price movements on assets using derivatives, trade cryptocurrencies, insure against risks, and earn interest in savings-like accounts. In some embodiments, DeFi uses a layered architecture and highly composable building blocks. In some embodiments DeFi platforms may allow creators and/or owners to lend or borrow funds from others, trade cryptocurrencies and/or NFTs, insure against risks, and receive payments. In a non-limiting embodiment, Defi may eliminate intermediaries by allowing creators, owners, collectors, and/or brokers to conduct financial transactions through peer-to-peer financial networks that use security protocols, connectivity, software, and hardware advancements. Persons skilled in the art, upon reviewing the entirety of this disclosure, will be aware of the various embodiments of implementing decentralized finance for purposes as described herein.

In a non-limiting embodiment, and still referring to FIG. 1, decentralized platform may implement Web 3.0. Whereas Web 2.0 is a two-sided client-server architecture, with a business hosting an application and users (customers and advertisers), "Web 3.0," as used in this disclosure, is an idea or concept that decentralizes the architecture on open platforms. In some embodiments, decentralized platform may enable communication between a plurality of computing devices, wherein it is built on a back-end of peer-to-peer, decentralized network of nodes, the applications run on decentralized storage systems rather than centralized servers. In some embodiments, these nodes may be comprised together to form a World Computer. A "World Computer," as used in this disclosure, is a group of computing devices that are capable of automatically executing smart contract programs on a decentralized network. A "decentralized network," as used in this disclosure, is a set of computing device sharing resources in which the architecture of the decentralized network distributes workloads among the computing devices instead of relying on a single central server. In a non-limiting embodiment, a decentralized network may include an open, peer-to-peer, Turing-complete, and/or global system. A World Computer and/or apparatus 100 may be communicatively connected to immutable sequential listing 156. Any digitally signed assertions onto immutable sequential listing 156 may be configured to be confirmed by the World Computer. Alternatively, or additionally, apparatus 100 may be configured to store a copy of immutable sequential listing 156 into memory 108. This is so, at least in part, to process a digitally signed assertion that has a better chance of being confirmed by the World Computer prior to actual confirmation. In a non-limiting embodiment, decentralized platform may be configured to tolerate localized shutdowns or attacks; it is censorship-resistant. In another non-limiting embodiment decentralized platform and/or apparatus 100 may incorporate trusted computing. In a non-limiting example, because there is no one from whom permission is required to join the peer-to-peer network, as long as one operates according to the protocol; it is open-source, so its maintenance and integrity are shared across a network of engineers; and it is distributed, so there is no central server nor administrator from whom a large amount of value or information might be stolen. Persons skilled in the art, upon reviewing the entirety of this disclosure, will be aware of the various embodiments and functions of decentralized platform 160 for purposes as described herein.

Still referring to FIG. 1, in one embodiment, self-executing action protocol 152 may be configured to facilitate NFT rentals in Web 2.0 and/or Web 3.0 (e.g., using ERC 4907 standard which allows an NFT owner to permit another individual to use the NFT for a designated period of time), wherein NFT owners can temporarily rent out their digital assets for different purposes. In one embodiment, when owner/lender of an NFT intends to enjoy the benefit of renting out NFTs that he or she isn't currently using, but would not like to sell, the owner/lender can generate self-executing action protocol 152 as a rental protocol to mint and transfer an expirable version of the NFT which contains all of the unique features and metadata of the original NFT to a borrower (e.g., gallery owner, collector, community member, and the like), wherein self-executing action protocol 152 secures the original NFT which is returned to the owner after self-executing action protocol 152 expires. For instance, in a non-limiting exemplary embodiment, processor 104 may be configured to verify information such as ownership type, ownership percentage, owner category, and the like to determine that the designated utility 148 of the NFT is to retain ownership and rent the NFT for a predetermined period of time. Based on the determined designated utility 148, processor 104 may be configured to generate self-executing action protocol 152 by encoding the predetermined conditions including the metadata of the original NFT in a newly minted expirable version of the original NFT to a borrower who is a gallery owner to display the expirable version during the predetermined period of time. In one embodiment, self-executing action protocol 152 may be generated to assign a use right to the borrower and put the original NFT into escrow, which also requires the borrower to provide an up-front payment that enables the rental without any collateral. In one embodiment, self-executing action protocol 152 is generated by transferring ownership of the NFT to the borrower (e.g., gallery owner, collector, community member, and the like) with predetermined conditions to ensure that the borrower will return ownership after the rental period is complete. In one embodiment, self-executing action protocol 152 is generated to allow the owner/lender to have full access and/or control of the rental experience end to end. In one embodiment, self-executing action protocol 152 is generated to allow integration of third-party protocols to manage NFT usage interests without permission from the NFT issuer.

With continued reference to FIG. 1, decentralized platform 160 may include a decentralized exchange platform. A "decentralized exchange platform," as is used in this disclosure, contains digital technology, which allows buyers and sellers of securities such as NFTs 120 to deal directly with each other instead of meeting in a traditional exchange. In some embodiments, decentralized platform may include an NFT marketplace. An "NFT marketplace" is a marketplace allowing uses to trade NFTs 120 and upload them to an address. Decentralized platform 160 may act as any NFT marketplace such as, but not limited to, OpenSea, Polygon, FCTONE, The Sandbox, CryptoKitties, Dentraland, Nifty Gateway, VEEFreinds, ROCKI, SuperRare, Enjin Marketplace, Rarible, WazirX, Portion, Zora, Mintable, PlayDapp, Aavegotchi, and the like thereof. Persons skilled in the art, upon reviewing the entirety of this disclosure, will be aware of the various embodiments of a marketplace in the context of NFTs 120.

Still referring to FIG. 1, in some embodiments, apparatus 100 may use optical character recognition to parse text, symbols, and the like from data collection 112. For example, optical character recognition may be used to recognize the names and numbers on a plurality of images. Optical character recognition may also be used to distinguish text and symbols in data collection 112. Additionally, in some embodiments apparatus 100 may also use an automatic speech recognition, machine-learning model to query and/or extract audio from data collection 112. For example, processor 104 may receive a voice command through interface 164 instructing the classification of audio data that matches the sound spoken by the user and/or a phrase spoken by the user. In one non-limiting embodiment, the utilization of optical character recognition and automatic speech recognition may be consistent with the utilization of optical character recognition and automatic speech recognition in U.S. patent application Ser. No. 17/984,571, filed on Nov. 10, 2022, and entitled, "AN APPARATUS AND FOR METHOD FOR MINTING NFTS FROM USER SPECIFIC MOMENTS," which is incorporated by reference herein in its entirety.

Figure 2:
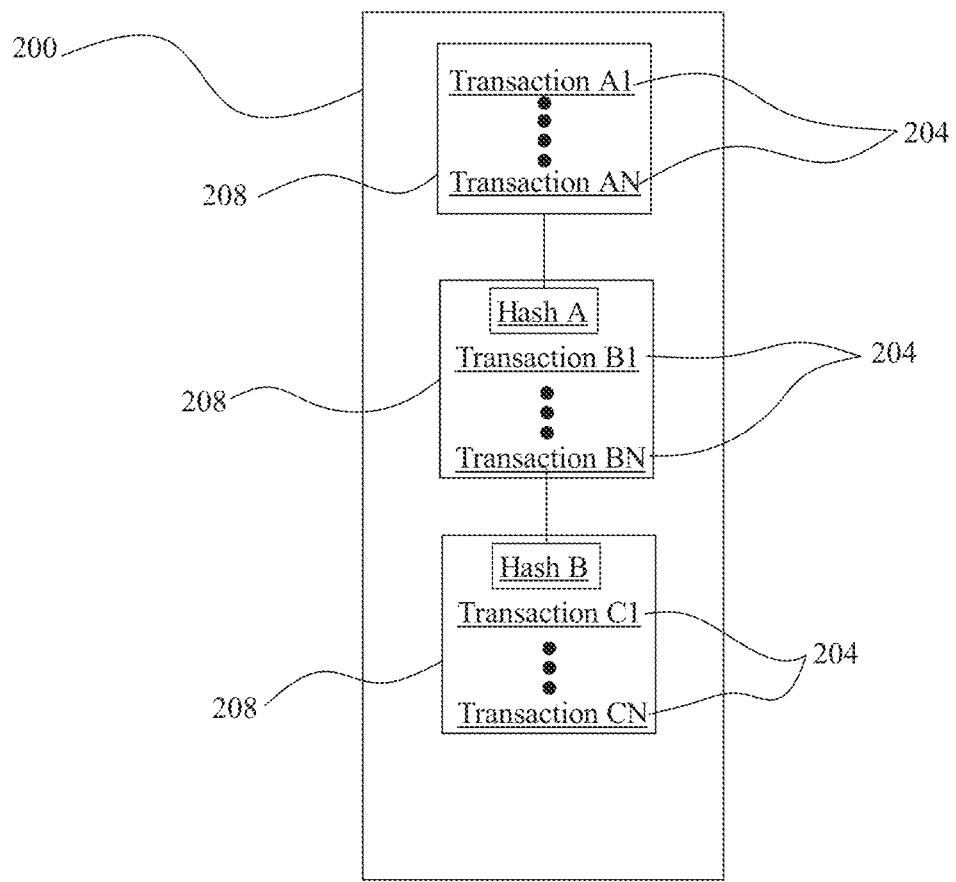
FIG. 2 is a block diagram of exemplary embodiment of an immutable sequential listing.

Referring now to FIG. 2, an exemplary embodiment of an immutable sequential listing 200 is illustrated. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing 200 may be, include and/or implement an immutable ledger, where data entries that have been posted to immutable sequential listing 200 cannot be altered. Data elements are listing in immutable sequential listing 200; data elements may include any form of data, including textual data, image data, encrypted data, cryptographically hashed data, and the like. Data elements may include, without limitation, one or more at least a digitally signed assertions. In one embodiment, a digitally signed assertion 204 is a collection of textual data signed using a secure proof as described in further detail below; secure proof may include, without limitation, a digital signature as described above.

Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of a NFT and/or virtual currency, such as crypto-currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, interests to ownership represented by an option, derivative financial instrument, commodity, debt-backed security such as a bond or debenture or other security as described in further detail below. A resource may be a physical machine e.g., a ride portion vehicle or any other asset. A digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2 immutable sequential listing 200 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 200 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 200 may preserve the order in which the at least a posted content took place by listing them in chronological order; alternatively or additionally, immutable sequential listing 200 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. Immutable sequential listing 200 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 200 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 200, once formed, may be inalterable by any party, no matter what access interests that party possesses. For instance, immutable sequential listing 200 may include a hash chain, in which data is added during a successive hashing process to ensure non-repudiation. Immutable sequential listing 200 may include a block chain. In one embodiment, a block chain is immutable sequential listing 200 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming immutable sequential listing 200 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208. Each sub-listing 208 created in immutable sequential listing 200 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 200 may develop a fork; protocol may determine which of the two alternate branches in the fork is the valid new portion of the immutable sequential listing 200 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 200 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in immutable sequential listing 200.

Still referring to FIG. 2, additional data linked to at least a posted content may be incorporated in sub-listings 208 in immutable sequential listing 200; for instance, data may be incorporated in one or more fields recognized by block chain protocols that permit a person or computer forming a at least a posted content to insert additional data in immutable sequential listing 200. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a posted content as described above.

Figure 3:
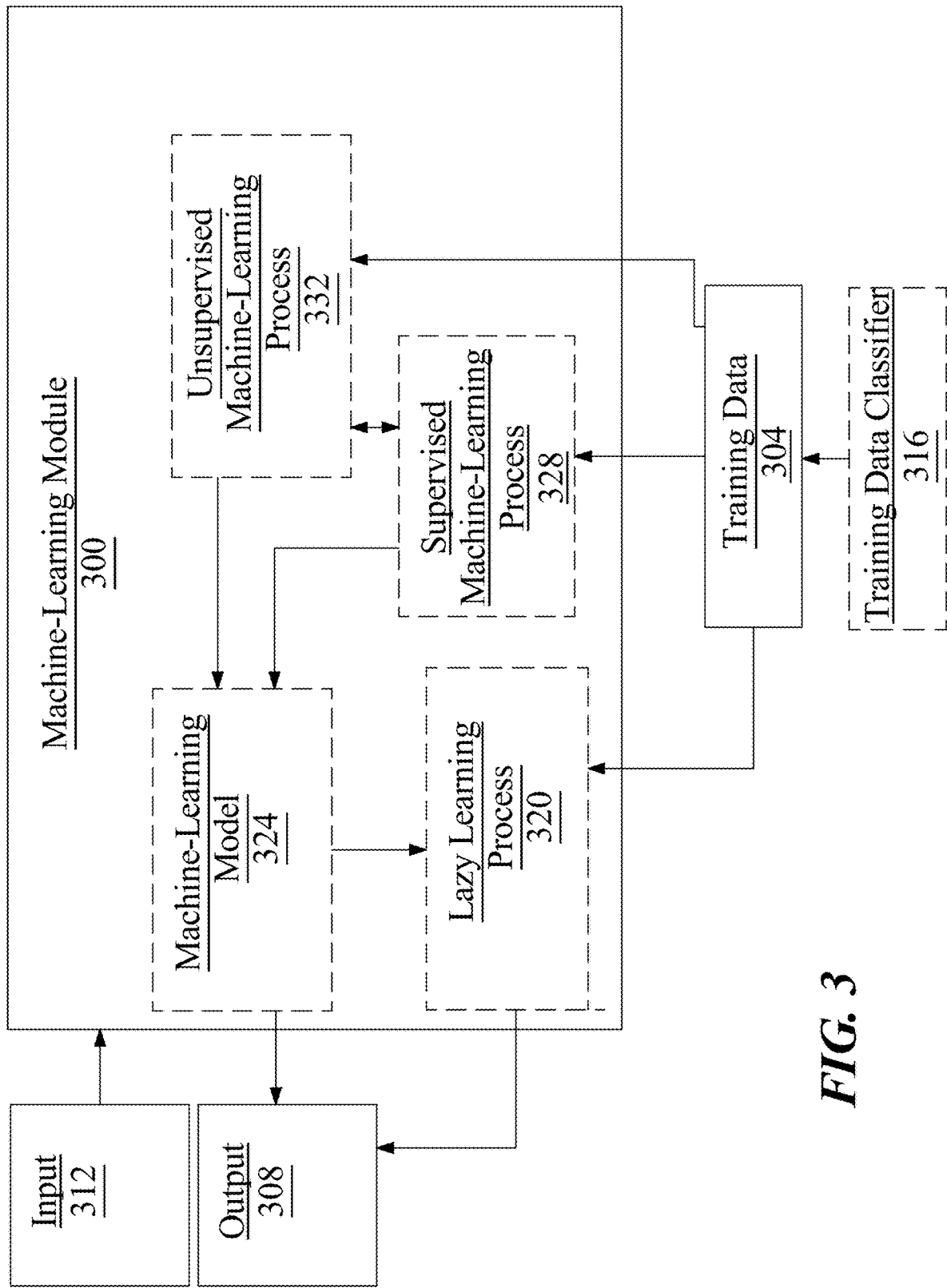
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network including an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating several inputs to outputs, and seek to find one or more mathematical relations relating inputs to outputs, where each of the one or more mathematical relations is optimal according to some criterion specified to the algorithm using some scoring function. For instance, a supervised learning algorithm may include inputs and outputs described through this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of one divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
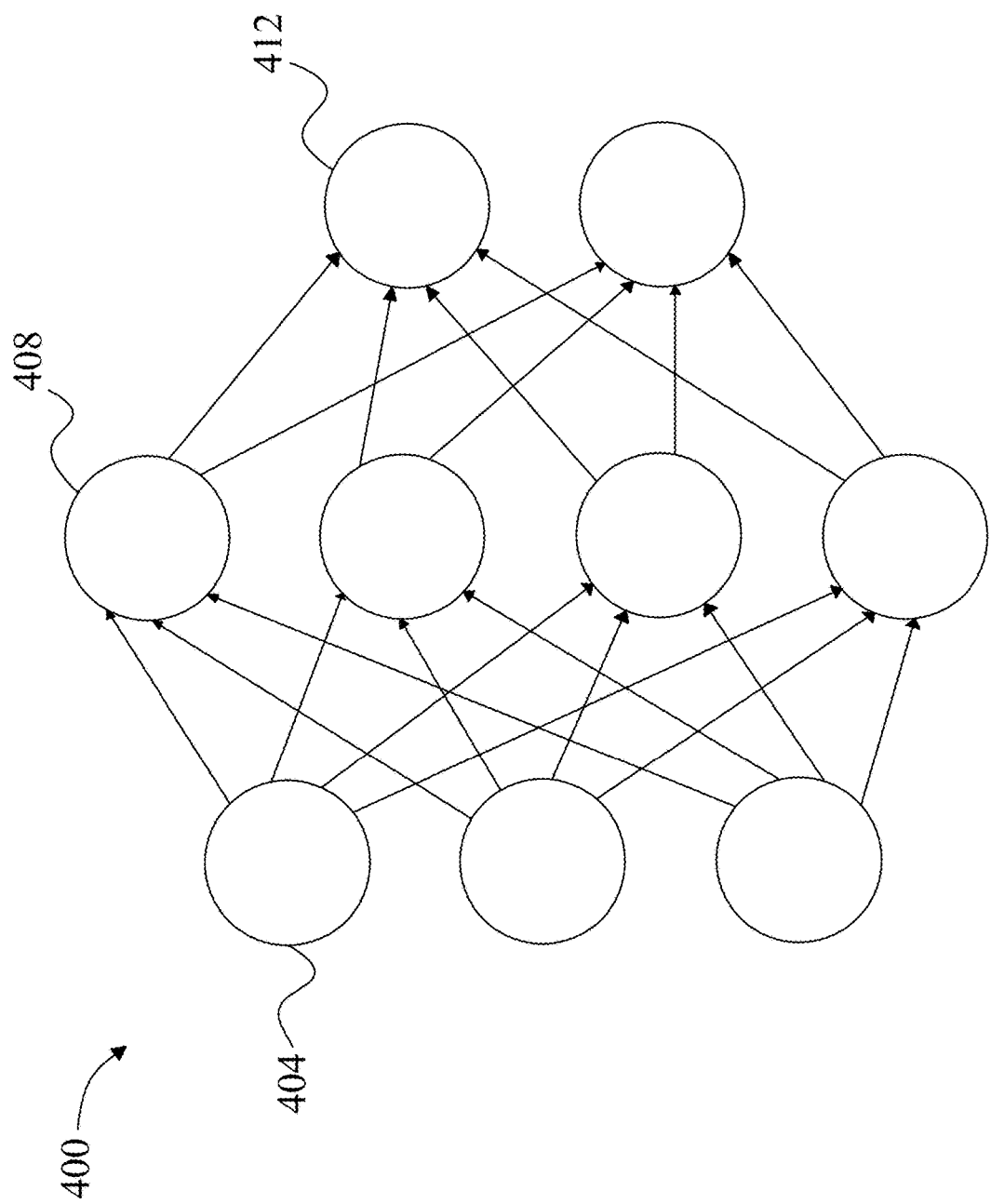
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
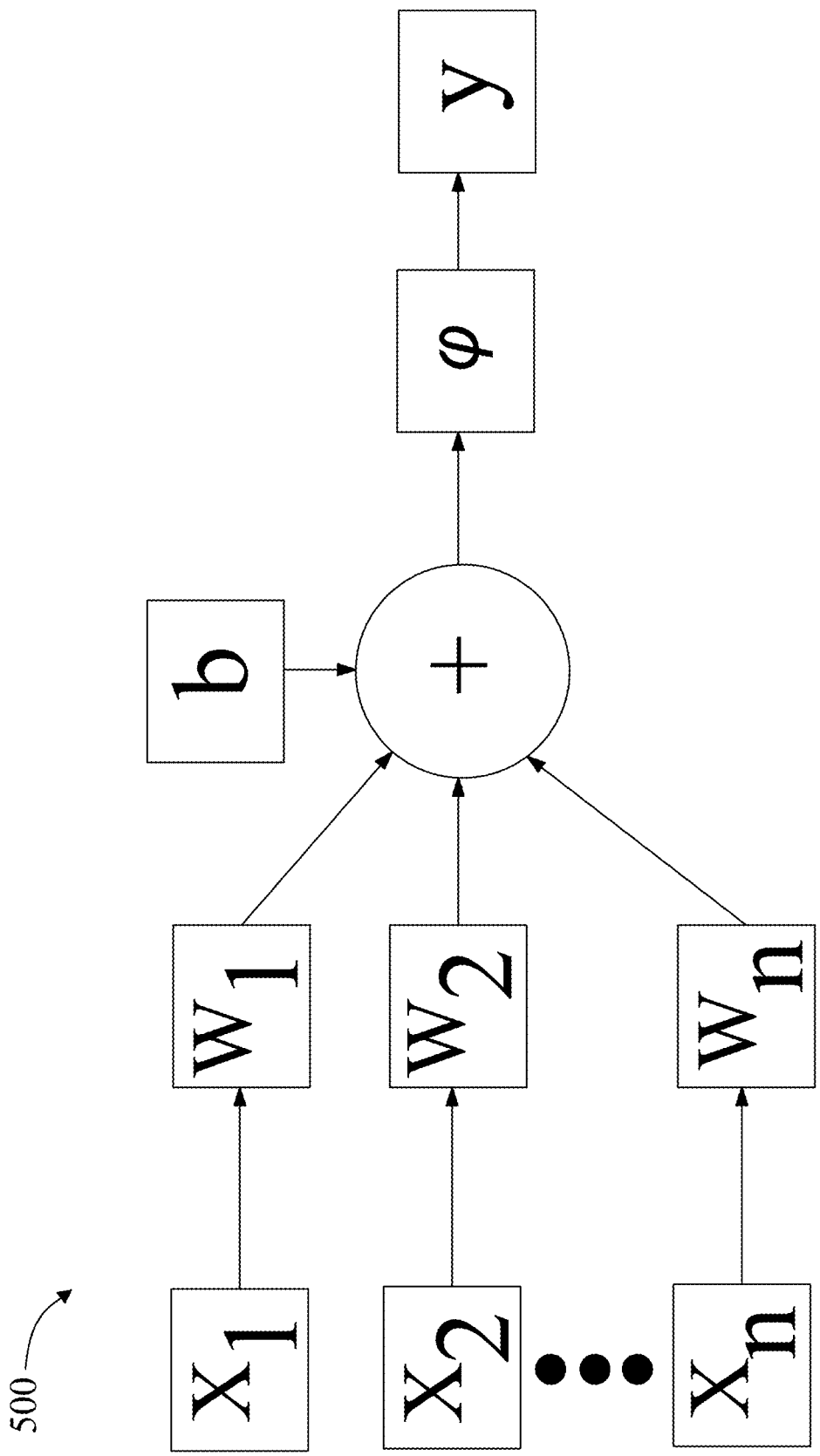
FIG. 5 is a block diagram of an exemplary embodiment of a node of a neural network.

Referring now to FIG. 5, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
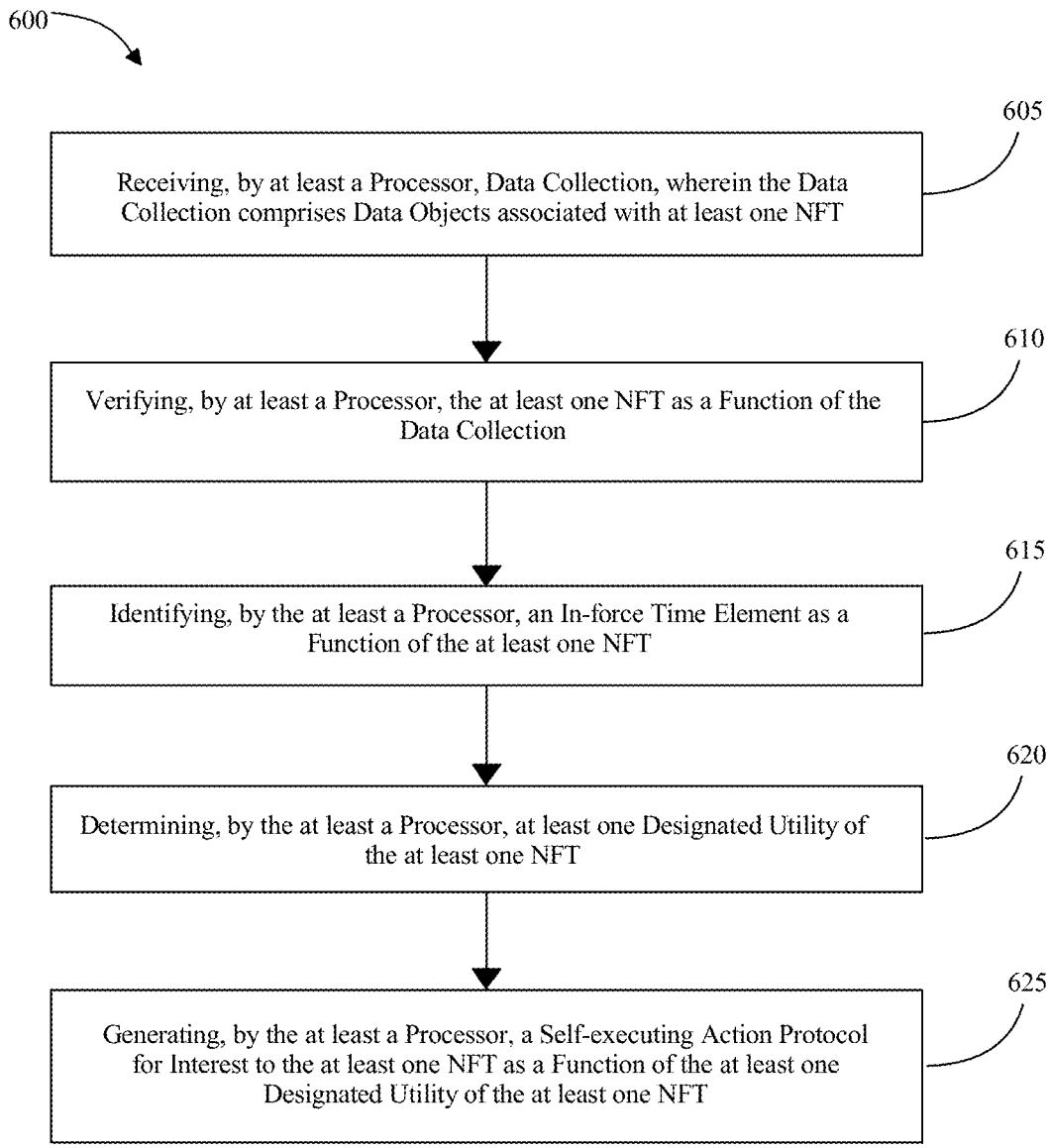
FIG. 6 is a flow diagram illustrating a method for temporarily sharing a NFT.

Referring now to FIG. 6, a flow diagram of an exemplary method 600 for temporarily sharing an NFT is illustrated. At step 605, method 600 includes receiving, by at least a processor, a data collection, wherein the data collection comprises a plurality of data objects associated with at least one NFT. In one embodiment, the data collection further includes data objects associated with a transferor and a transferee of the NFT. Further, data objects may include different user categories of the transferor and the transferee. For instance, in some exemplary embodiment, the transferor may be a creator, collector, collaborator, or broker as a seller or a licensor, whereas the transferee may be a collector and/or gallery as a buyer or a licensee. In one embodiment, the at least one NFT is a fractional NFT which comprises a plurality of portions that can be accessed and transferred between the transferor and the transferee independently. This may be implemented as described and with reference to FIGS. 1-5.

Still referring to FIG. 6, at step 610, method 600 includes verifying, by the at least a processor, the at least one NFT as a function of the data collection. In one embodiment, verifying the at least one NFT as a function of the data collection comprises utilizing a verification module configured to analyze the data collection and generate a verification datum as a function of the data collection. In some embodiment, a verification datum may include an indication of a type and/or a percentage of an ownership of the at least one NFT. In one embodiment, the data collection is analyzed prior to the verification process, wherein a decision tree may be employed to classify a plurality of data objects of the data collection into different classes for verification purposes. This may be implemented as described and with reference to FIGS. 1-5.

With continued reference to FIG. 6, at step 615, method 600 includes identifying, by the at least a processor, an in-force time element as a function of the at least one NFT. In one embodiment, the in-force time element may include an in-force time duration defined by an in-force start time and an in-force end time. This may be implemented, without limitation, as described above with reference to FIGS. 1-5.

Continuing to refer to FIG. 6, at step 620, method 600 includes determining, by the at least a processor, at least one designated utility of the at least one NFT. In one embodiment, and without limitation, the determination may be made based on the indication of the type and/or percentage of the ownership of the at least one NFT. For instance, in an exemplary embodiment, if the verification datum verifies that the NFT is a fractional NFT which comprises a plurality of portions that are independently accessible and transferable, some of the portions of the ownership may be sold by the owner of those portions to a buyer, while other portions may be licensed by the owner of those portions to a licensee. In one embodiment, determining at least one designated utility of the at least one NFT further includes using a utility designation machine-learning model configured to correlate utility designations with the verification datum. This may be implemented as described and with reference to FIGS. 1-5.

Still referring to FIG. 6, at step 625, method 600 includes generating, by the at least a processor, a self-executing action protocol for interests to the at least one NFT as a function of the at least one designated utility of the at least one NFT. In one embodiment, the self-executing action protocol includes modification of display and/or access interests within a transferor and/or a transferee based on the at least one designated utility of the at least one NFT. In some embodiments, and without limitation, the self-executing action protocol is stored in an immutable sequential listing in a decentralized marketplace. In some embodiments, method 600 may also include providing modification of display and/or access interests within the transferor and/or transferee regarding a self-executing action protocol. In some embodiments, generating self-executing action protocol may include activating the self-executing action protocol for interests to the at least one NFT as a function of the in-force start time and deactivating the self-executing action protocol for interests to the at least one NFT as a function of the in-force end time. In an embodiment, activating the self-executing action protocol may include generating a wrapped NFT as a function of the at least one NFT. In another embodiment, deactivating the self-executing action protocol may include destroying a wrapped NFT. This may be implemented as described and with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, and the like.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, and the like.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, and the like.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
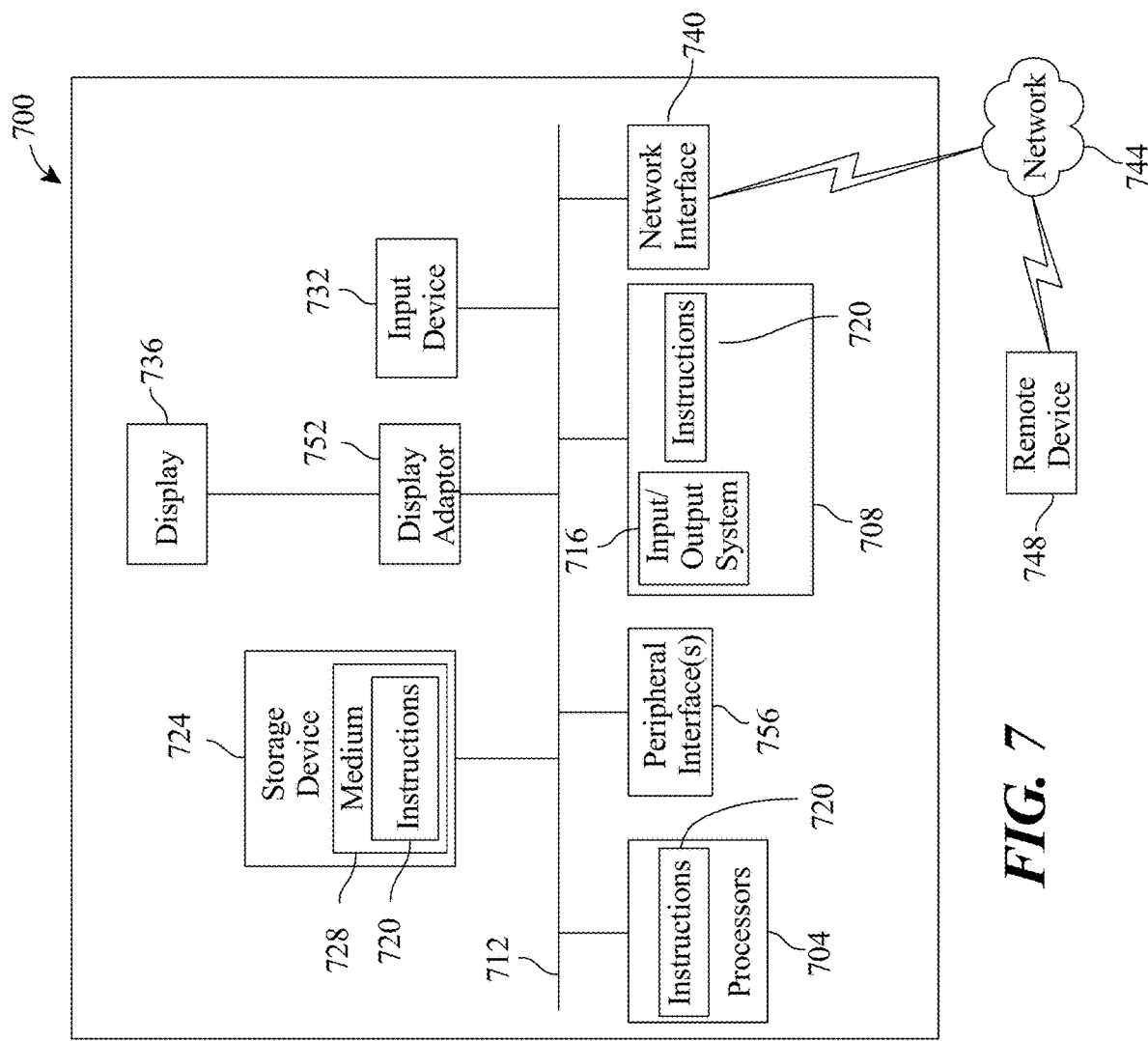
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, and the like.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, and the like.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, and the like.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for temporarily sharing a non-fungible token (NFT), wherein the apparatus comprises:
    at least a hardware processor; and
    a memory communicatively connected to the at least a hardware processor, wherein the memory containing instructions configuring the at least a hardware processor to:
        receive a data collection, wherein the data collection comprises a plurality of data objects associated with at least one NFT;
        verify the at least one NFT as a function of the data collection;
        identify an in-force time element as a function of the at least one NFT, wherein the in-force time element comprises in-force time duration defined by an in-force start time and an in-force end time;
        determine at least one designated utility of the at least one NFT; and
        generate a self-executing action protocol configured to be executed on a decentralized platform implementing decentralized finance for interests to the at least one NFT as a function of the in-force time element, and the at least one designated utility of the at least one NFT and wherein generating the self-executing action protocol further comprises:
            activating the self-executing action protocol for interests to the at least one NFT as a function of the in-force start time; and
            deactivating the self-executing action protocol for interests to the at least one NFT as a function of the in-force end time.

2. The apparatus of claim 1, wherein the data collection comprises information associated with a transferor and a transferee of the at least one NFT.

3. The apparatus of claim 1, wherein the at least one NFT comprises:
    a fractional NFT comprising a plurality of portions, wherein each portion is independently accessible.

4. The apparatus of claim 1, wherein verifying the at least one NFT as a function of the data collection comprises:
    utilizing a verification module configured to generate a verification datum as a function of the data collection.

5. The apparatus of claim 4, wherein determining at least one designated utility of the at least one NFT comprises:
    utilizing a utility designation machine-learning model configured to correlate the verification datum to a designated utility datum.

6. The apparatus of claim 1, wherein activating the self-executing action protocol comprises generating a wrapped NFT as a function of the at least one NFT.

7. The apparatus of claim 1, wherein deactivating the self-executing action protocol comprises destroying a wrapped NFT.

8. The apparatus of claim 1, wherein the self-executing action protocol is configured to be executed in the decentralized platform.

9. A method for temporarily sharing a non-fungible token (NFT), wherein the method comprises:
    receiving, by at least a hardware processor, a data collection, wherein the data collection comprises a plurality of data objects associated with at least one NFT;
    verifying, by the at least a hardware processor, the at least one NFT as a function of the data collection;
    identifying, by the at least a hardware processor, an in-force time element as a function of the at least one NFT, wherein the in-force time element comprises in-force time duration defined by an in-force start time and an in-force end time;
    determining, by the at least a hardware processor, at least one designated utility of the at least one NFT; and
    generating, by the at least a hardware processor, a self-executing action protocol configured to be executed on a decentralized platform implementing decentralized finance for interests to the at least one NFT as a function of the in-force time element and the at least one designated utility of the at least one NFT and wherein generating the self-executing action protocol further comprises:
        activating the self-executing action protocol for interests to the at least one NFT as a function of the in-force start time; and
        deactivating the self-executing action protocol for interests to the at least one NFT as a function of the in-force end time.

10. The method of claim 9, wherein the at least one NFT comprises:
    a fractional NFT comprising a plurality of portions, wherein each portion is independently accessible.

11. The method of claim 9, wherein the data collection comprises information associated with a transferor and a transferee of the at least one NFT.

12. The method of claim 9, wherein verifying the at least one NFT as a function of the data collection comprises:
    utilizing a verification module configured to generate a verification datum as a function of the data collection.

13. The method of claim 12, wherein determining at least one designated utility of the at least one NFT comprises:
    utilizing a utility designation machine-learning model configured to correlate the verification datum to a designated utility datum.

14. The method of claim 9, wherein activating the self-executing action protocol comprises generating a wrapped NFT as a function of the at least one NFT.

15. The method of claim 9, wherein deactivating the self-executing action protocol comprises destroying a wrapped NFT.

16. The method of claim 9, wherein the self-executing action protocol is configured to be executed in the decentralized platform.

* * * * *